United States Patent [19]
Emanuel

[11] Patent Number: 5,161,019
[45] Date of Patent: Nov. 3, 1992

[54] "CHANNEL GUIDE" AUTOMATICALLY ACTIVATED BY THE ABSENCE OF PROGRAM INFORMATION

[75] Inventor: Peter M. Emanuel, Clarksburg, N.J.

[73] Assignee: RCA Thomson Licensing Corporation, Princeton, N.J.

[21] Appl. No.: 546,470

[22] Filed: Jun. 29, 1990

[51] Int. Cl.⁵ .............................................. H04N 5/50
[52] U.S. Cl. .................. 358/183; 358/191.1; 358/336; 358/189
[58] Field of Search ............... 358/183, 22 PIP, 193.1, 358/191.1, 188, 189, 714, 336; 455/15 P, 161, 179, 185, 186, 184

[56] References Cited

U.S. PATENT DOCUMENTS

| | | | |
|---|---|---|---|
| 4,085,426 | 4/1978 | Aigrain et al. | 358/336 |
| 4,430,671 | 2/1987 | Tamer | 358/192.1 |
| 4,665,438 | 5/1987 | Miran et al. | 358/22 PIP |
| 4,729,027 | 3/1988 | Hakamada et al. | 358/22 PIP |
| 4,763,195 | 8/1988 | Tults | 358/195.1 |
| 4,774,582 | 9/1988 | Hakamada et al. | 358/22 PIP |
| 4,799,111 | 1/1989 | Ito | 360/49 |
| 4,821,122 | 4/1989 | Terkey | 358/193.1 |
| 4,837,627 | 6/1989 | Mengel | 358/191.1 |
| 4,890,168 | 12/1989 | Inoue et al. | 358/183 |
| 4,897,727 | 1/1990 | Richards | 358/188 |
| 4,903,129 | 2/1990 | Bell et al. | 358/183 |
| 4,905,077 | 2/1990 | Ishii | 358/183 |
| 4,907,082 | 3/1990 | Richards | 358/188 |
| 4,914,516 | 4/1990 | Duffield | 358/183 |
| 4,918,531 | 4/1990 | Johnson | 358/183 |
| 4,953,034 | 8/1990 | Kanda | 358/336 |
| 4,984,082 | 1/1991 | Okamura | 358/22 PIP |

FOREIGN PATENT DOCUMENTS

| | | |
|---|---|---|
| 2185906 | 1/1974 | France . |
| 58-224452 | 12/1983 | Japan . |
| 63-078680 | 4/1988 | Japan . |
| 1-044179 | 2/1989 | Japan . |
| 1-243787 | 9/1989 | Japan . |
| 2-266677 | 10/1990 | Japan . |
| 2222340 | 2/1990 | United Kingdom . |
| 2232553 | 12/1990 | United Kingdom . |

Primary Examiner—James J. Groody
Assistant Examiner—Jeffrey S. Murrell
Attorney, Agent, or Firm—Joseph S. Tripoli; Peter M. Emanuel; Thomas F. Lenihan

[57] ABSTRACT

A "channel guide" system, including a picture-in-picture processing unit for displaying an array of images corresponding to respective channels or auxiliary televisions signals on a display screen is automatically activated when the video signal currently being processed by the receiver no longer contains program information (e.g., either does not contain valid video information, or represents a uniform screen). In a VCR, the "channel guide" system is automatically initiated in response to the detection of the end of tape.

12 Claims, 3 Drawing Sheets

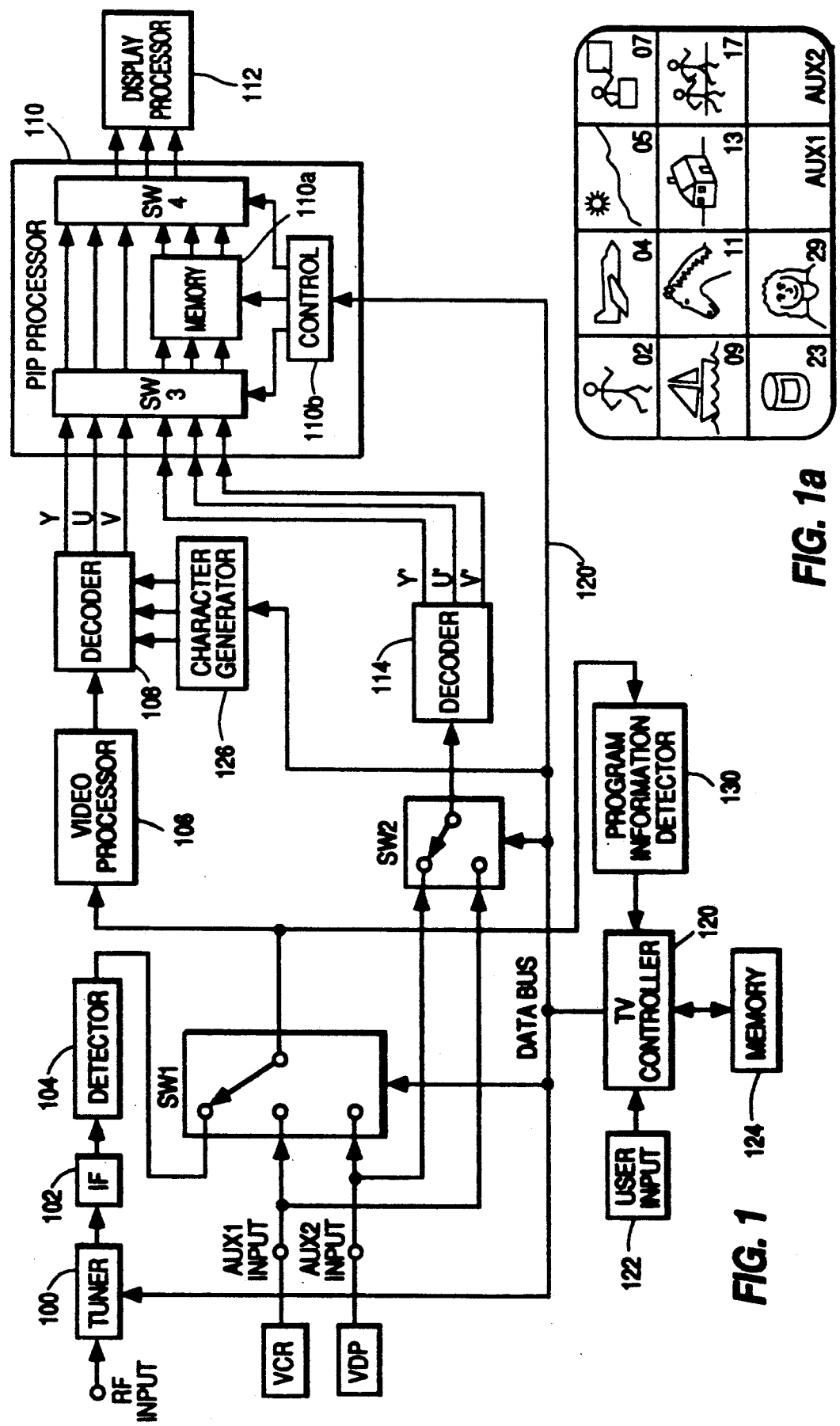
FIG. 1a
FIG. 1

"CHANNEL GUIDE" AUTOMATICALLY ACTIVATED BY THE ABSENCE OF PROGRAM INFORMATION

CROSS REFERENCE TO A RELATED APPLICATION

A patent application bearing Ser. No. 547,089 (Duffield), entitled AUTOMATIC CHANNEL SAMPLING PICTURE-IN-PICTURE CIRCUITRY, filed on the same date as this application, concerns related subject matter.

FIELD OF THE INVENTION

The present invention concerns a so-called "channel guide" feature of a television system used to simultaneously display, usually in still picture or "snapshots" form, a plurality of pictures corresponding to respective channels.

BACKGROUND OF THE INVENTION

Some current television receivers include a so-called picture-in-picture (PIP) processing unit for displaying a small picture inset within a larger picture. Such PIP units are usually also capable of displaying a plurality of (e.g., 9 or 12), pictures at the same time. This multiple picture mode of operation is often utilized to display a plurality of pictures corresponding to respective channels during so-called "channel guide" mode of operation. During the "channel guide" mode of operation, the tuner of a television system is caused to tune a number (corresponding to the number of simultaneously displayed pictures) of channels in sequence. As each channel is tuned, information corresponding to a video frame or field is stored in a respective section of a memory associated with the PIP processing unit. Thereafter, the video information corresponding to each channel is read out of the memory and caused to be displayed in a respective section of the display device. The video information stored in the memory may be periodically updated. The "channel guide" feature is useful for quickly determining what programs are currently being provided on a number of channels.

Such "channel guide" feature has in the past been activated in response to a user initiated command.

SUMMARY OF THE INVENTION

It is herein recognized that it is desirable to provide apparatus for automatically initiating the "channel guide" mode of operation of a picture-in-picture processing unit in response to the absence of program information. For example, it is herein recognized that it is desirable to automatically initiate the "channel guide" mode of operation when a user is watching a video tape cassette and the recorded program is finished. This allows the user to know what broadcast or cable programs are available without having to manually "scan" through various channels.

In accordance with the invention, in a television system having apparatus for selecting a television signal from a plurality of television signals and apparatus for generating a display signal representing a picture including a plurality of images corresponding to respective ones of the television signals during a multiple-image mode of operation, apparatus for automatically initiating the multiple-image mode of operation when the absence of program information is detected for a first selected television signal.

More specifically, in accordance with an aspect of the invention, in a television system including a tuner, a picture-in-picture (PIP) processing unit capable of producing multiple pictures on a screen of a display device, and apparatus for controlling the tuner and the PIP processing unit to produce multiple pictures corresponding to respective channels on the screen during a "channel guide" mode of operation, a detector is provided for determining when program information is absent. The detector is coupled to the control unit for automatically initiating a "channel guide" mode of operation in response to the absence of program information.

The invention may be embodied in several forms. In one form, the absence of program information is determined by examining the synchronization component of the video signal. In another form of the invention, the detector may examine the active interval of the video signal to determine if a predetermined number of image transitions are present during a predetermined time interval, e.g., corresponding to all or a portion of a television field. The latter is useful in situations in which the television signal source such as a video cassette recorder (VCR) or video display player (VDP) provides a television signal (either as a modulated RF picture carrier or as a baseband video signal) for producing a uniformly blanked image (e.g., in a so-called "blue-screen" or "black-screen" mode) in the absence of program information.

In accordance with another aspect of the invention, picture-in-picture processing unit may be located in either a television set (i.e., a television receiver having both a tuner and a display device), or in a television receiver such as a VCR, not having a display device.

In accordance with yet another aspect of the invention, apparatus for automatically initiating a multiple-picture mode of operation may be utilized in a television system having inputs for receiving baseband signals in order to simultaneously display a plurality of pictures corresponding to respective signal sources connected to the baseband signal inputs when the absence of program information is detected.

BRIEF DESCRIPTION OF THE DRAWING

These and other aspects of the present invention will be described with reference to the accompanying drawing in which:

FIG. 1 shows, in block diagram form, an embodiment of the invention within a television receiver of the type including a display device.

FIG. 1a shows a graphical representation of a "channel guide" multiple-picture display;

DETAILED DESCRIPTION OF THE EMBODIMENT

Figure 2:
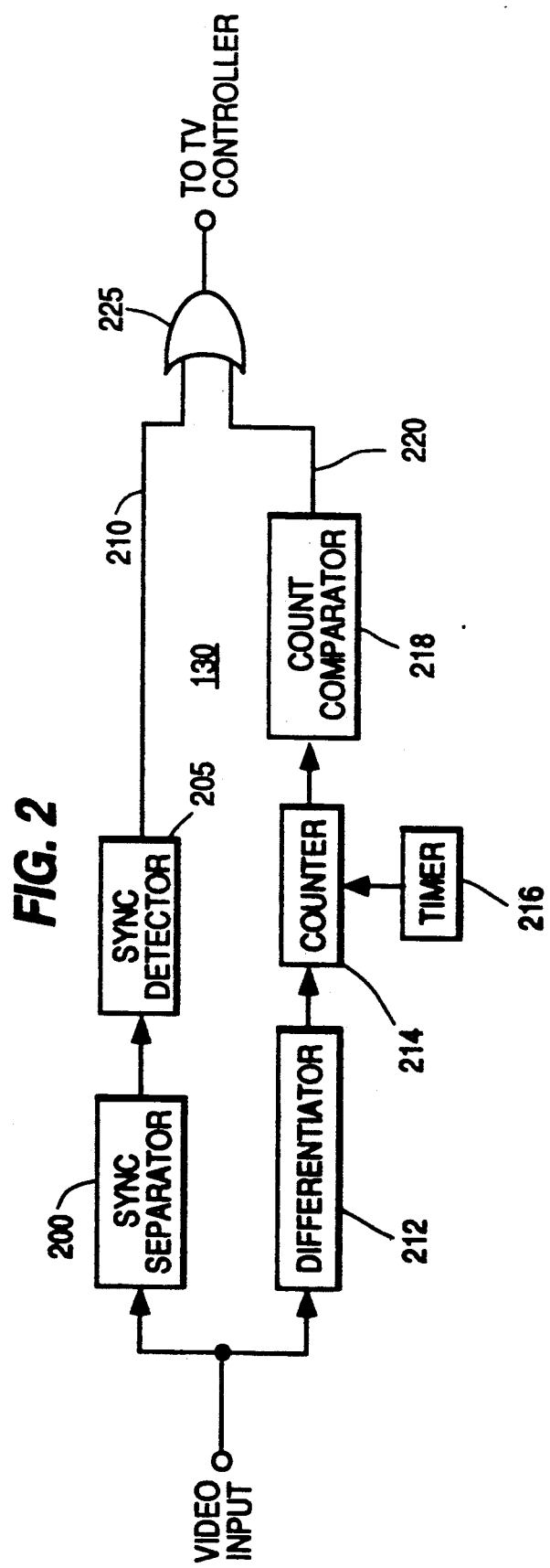
FIG. 2 shows, in block diagram form, an embodiment of a detector for detecting the absence of program information which may be used in the arrangement shown in FIG. 1.

FIG. 1 shows a television receiver including a tuner 100, IF section 102, video detector 104, video signal processing section 106, a decoder 108, and a display processing section 112. The receiver is arranged in conventional fashion to produce a luminance (Y) signal and two color difference signals (U and V) at respective outputs of decoder 108 from a received television signal. The Y, U and V signals are coupled to the display processing section in order to display images on the screen of a display device. The receiver also includes first (AUX 1 input) and second (AUX 2 input) auxiliary input terminals for receiving respective composite baseband video signals and a first switching section SW1 for selectively coupling either the output signal of video detector 104 or one of the two auxiliary input signals to video processing section 106. The auxiliary inputs may be used for receiving baseband video signals from a video cassette recorder (VCR) or video disc player (VDP). A VCR and VDP produces baseband video signals be recovering a baseband video signal from the respective recording medium, i.e. video tape or video disc.

The receiver additionally includes a picture-in-picture (PIP) processing unit 110 for selectively inserting a small sub-image within a larger main image. The PIP processing unit receives components (Y, U and V) from decoder unit 108. It also receives video signals (Y', U' and V') derived by a second decoder unit 114 from a composite baseband video signal provided by a second switching unit SW2. Second switching unit SW2 provides either the first or the second auxiliary input signals to second decoder unit 114.

The PIP processing unit 110 includes an input switching section SW3, an output switching section SW4, a memory 110a, and a control unit 110b. PIP processing unit 110 is capable of inserting a small picture corresponding to either one of the two sets of component video input signals (i.e., either one of two sets of signals comprising signals Y, U, V or Y', U', V') into a large, full-screen picture corresponding to the other set of component video input signals. PIP processing unit 110 is also capable of providing simultaneous multiple images, and particularly in connection with the present invention, multiple images corresponding to programs of respective channels during a so-called "channel guide" mode of operation.

Various portions of the television receiver so far described are controlled by a television controller 120 including a microprocessor operating under program control. Television controller 120 generates digital control signals which are coupled to various portions of the receiver through a data bus 120'. Television controller 120 receives user-initiated commands from a user input unit 122 which may comprise a keyboard either directly mounted on the television receiver, or mounted on a remote control transmitter.

During the "channel guide" mode of operation, television controller 120 causes tuner 100 to tune different channels in sequence. The number of channels which are tuned is determined by the number of multiple pictures which are to be displayed simultaneously. The channel numbers of the specific channels which are to be sequentially tuned are stored in a memory 124 associated with the television controller. After a channel is tuned, a field of the corresponding video signal is stored in a respective section of the memory of the picture-in-picture processing unit. Depending on the size of the memory, a sub-sampled field (i.e., a field from which picture samples and lines have been removed) or a frame of (two fields) video information may be stored rather than a field. When all the sections of the PIP processing unit are filled, the contents of the sections are sequentially read-out of the memory at a rate faster than the rate at which they are read-in. The result is the display of a plurality of small pictures in an array such as shown in FIG. 1a. Television controller 120 also causes a character generator 126 to generate character-representative signals for displaying the channel numbers corresponding to the various programs to be displayed in the respective sections of the screen. The character signals are coupled to the first decoder so that they may be combined with the Y, U and V component video signals. The apparatus described thus far is known, for example, from U.S. Pat. No. 4,914,516 entitled FAST RESPONSE PICTURE-IN-PICTURE CIRCUITRY issued to Duffield on 3 Apr. 1990.

The input signal derived from either the tuner or the auxiliary inputs may at some time cease to contain information corresponding to a program. For example, the channel to which the tuner is presently tuned may go off the air. Alternatively, pre-recorded program information supplied from a VCR or video disc player may end. Under such conditions, the display will not produce an image representative of program material. Some VCRs and video disc players produce a video signal representative of a uniformly blanked image when the pre-recorded program ends. For example, the screen may be a uniformly black or blue image (the latter being a so-called "blue-screen" image). The term "absence of program information", as used herein, is intended to include the situation in which a video signal for providing a uniform screen of any shade or color. It is also intended to include the situation in which a video signal does not contain any information suitable for meaningful display. Such a signal may be one in which program information is weak or absent, and substantially only noise components are present.

It is herein recognized that when program information is not present (i.e., in the absence of program information, as defined above), it is desirable that the user be informed of what programs are available for viewing. In accordance with one aspect of the present invention, this is accomplished by automatically causing the initiation of the so-called "channel guide" mode of operation when program information is not contained in the received video signal. More specifically, a program information detector 130 is coupled to the output of first switching unit SW1 for detecting the presence of program information. The output of the program information detector is coupled to television controller 120. In the absence of program information, the television controller initiates the "channel guide" mode of operation. The specific details of the program information detector will be discussed with reference to FIG. 2.

Before describing the image detector shown in FIG. 2, it is noted that in addition to causing the operation of the "channel guide" mode of operation, in accordance with another aspect of the present invention, it is possible to allocate some of the sectors of the multiple image to the auxiliary baseband signal sources. This may be accomplished by causing the first switching section to switch between the output of the detector section and each one of the two auxiliary inputs.

Turning now to FIG. 2, program information detector 130 of the arrangement of FIG. 1 will be described in detail. It includes a first section including a sync separator 200 and a sync presence detector 205 for determining whether or not a valid (correct) synchronizing component is present. When a received signal does not contain any video information (i.e., neither program or synchronization information), a synchronization component will not be present. However, in a situation in which the selected channel or auxiliary video source is providing a signal representative of a uniformly blanked blue screen or a black screen, synchronizing components will be present. To detect the absence of program information in this situation, a second section of the program information detector comprises a differentiator 212 for generating pulses corresponding to video signal transitions, a counter 214 associated with a timing generator 216, and a count comparator 218 for determining whether or not a predetermined number of signal transitions has occurred within a given time interval (e.g., corresponding to a field). So as to distinguish the transitions corresponding to program information from transitions corresponding to synchronization components, a sync pulse clipper (not shown) may be provided prior to differentiator 212 to remove synchronization components from the video signal. A clipper may also follow differentiator (212) to remove transitions of a given sense (i.e., either black-going or white-going). If either the synchronization component is absent, or there are less than the predetermined number of transitions, an "or" function circuit 225 coupled to the two sections of the image detector produces a signal representative of the absence of program information. That is, the signal developed on line 210 is "true" (i.e., a high logic level) in the absence of sync, and the signal developed on line 220 is "true" (i.e., a high logic level) in the absence of the predetermined number of transitions in the video signal.

Figure 3:
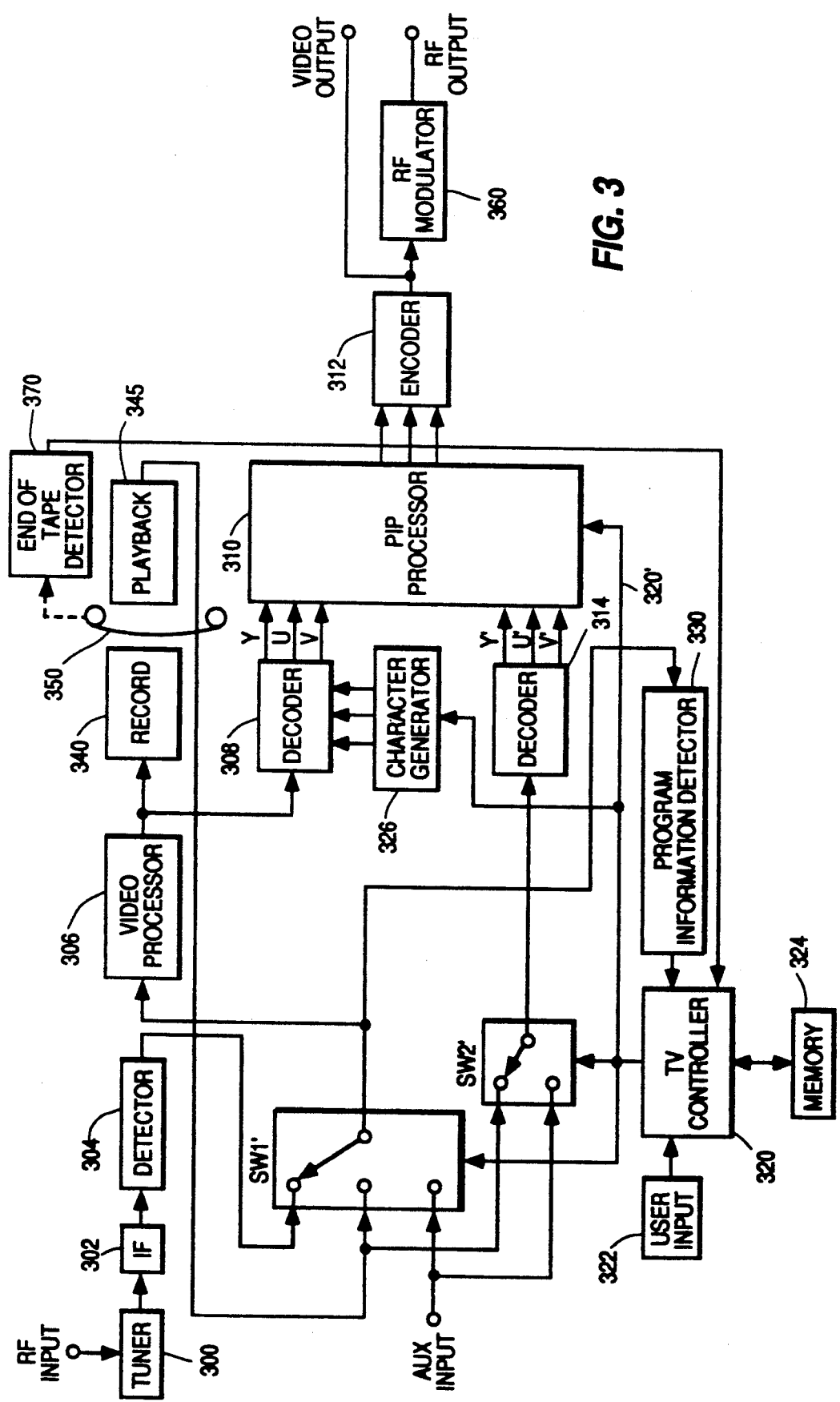
FIG. 3 shows, in block diagram form, an embodiment of the invention within a VCR.

FIG. 3 shows an arrangement of a VCR including a picture-in-picture processing unit. Those portions of the arrangement of FIG. 3 similar to those in FIG. 1 will not be described in detail. The main difference between the arrangements shown in FIGS. 1 and 3 is that the VCR includes a record section 340 and a playback section 345 for recording video information on a magnetic tape 350 during a recording mode and playing it back during a playback mode. Playback section 345 is coupled to an input of a first switching section SW1'. By way of comparison, the playback signal replaces the second auxiliary signal of the arrangement shown in FIG. 1. An encoder for forming a composite television signal from a television signal is provided in place of the display processor unit of the arrangement shown in FIG. 1. The output of encoder unit 312 is coupled both to a baseband video output terminal, and to an RF modulator 360 which provides a modulated RF signal at an RF output terminal. The VCR also includes a character generator 326 for generating character signals as in the arrangement shown in FIG. 1. The character generator is also capable of generating a video signal corresponding to a uniformly blanked screen, for example, in either blue or black.

As in the arrangement of FIG. 1, a program information detector 330 is coupled to the output of first switching section SW1'. It may be formed as shown in FIG. 2, or may alternatively just comprise the first section for detecting the absence of a synchronization component in the case where an auxiliary input (for receiving a signal from a VCR or VDP) is not provided.

Automatic initiation of the channel guide feature is also provided in response to a signal developed by an "end of tape" detector 370 coupled between the tape drive unit (as illustrated by the dotted line connection to the tape 350) and the television controller.

It will be appreciated that the embodiments described above are exemplary and that modifications may be made. For example, before the "channel guide" mode of operation is initiated, a message may be displayed inquiring if this mode of operation is desired.

In the embodiments described with reference to FIGS. 1 and 3, the channels corresponding to the images displayed during the "channel guide" mode of operation are stored in a memory previously programmed by the user. It is also recognized that the channels displayed during the "channel guide" mode of operation may be those channels currently "active" ("on-the-air") when the absence of program information is detected. Program information detector may be used to determine the active channels. Alternately, an automatic fine tuning signal (AFT) may be used for this purpose alone or in conjunction with other signal presence detectors, such as the program information detector.

The term "television receiver", as used herein, is intended to include television receivers having a display device (commonly known as television sets), television receivers without a display device, such as videocassette recorders (VCRs), and television monitor/receivers having baseband signal input circuitry as well as an RF tuner.

What is claimed is:

1. A television system, comprising:
   selection means for selecting a television signal from a plurality of television signals;
   main signal processing means for processing a main picture signal provided by said selection means and corresponding to a main picture;
   auxiliary signal processing means for storing samples representative of a selected television signal for each of a plurality of secondary television signals, and for producing a combined signal which represents a picture including a plurality of images corresponding to respective ones of said secondary television signals in a plurality of inset-image locations of said picture;
   detection means for providing a control signal representative of the detection of the absence of program information in said main picture signal; and
   control means, coupled to said detection means, said auxiliary signal processing means, and said selection means, for automatically causing said selection means to select each of said plurality of television signals sequentially, and automatically causing said auxiliary signal processing means to store said samples and produce said combined signal in response to said control signal.

2. The television system of claim 1, wherein said signal selection means is a tuner demodulator means for producing a baseband video signal from a selected radio frequency television signal.

3. A picture-in-picture system for a television receiver, comprising:
   tuner demodulator means having an input for receiving a plurality of radio frequency signals, and having a control input for receiving a first control signal, said tuner demodulator means tuning one of said radio frequency signals in response to said first control signal and producing a detected video signal therefrom at an output;
   memory means having data representing a list of television channel stored therein;
   main signal processing means for processing a main picture signal provided by said tuner demodulator means and corresponding to a main picture;

picture-in-picture processing means having an input coupled to said output of said tuner demodulator means for receiving said detected video signal and for storing a predetermined amount of said detected video signal, and for producing a display signal which when displayed on a display screen produces a display comprising an inset-image displayed in one of a plurality of inset-image locations, said inset-image being related to said stored video signal;

control means for controlling said tuner demodulator means and for controlling said picture-in-picture processing means, said control means having an output for developing said first control signal; and means for detecting the absence of program information in said main picture signal, said detecting means having an input coupled to said output of said tuner demodulator means for receiving said detected video signal and an output coupled to said control means for developing a second control signal indicative of the absence of program information in said main picture signal;

said control means in response to said second control signal automatically causes said tuner demodulator means to tune each of said television channels represented in said stored list of television channels, and automatically causes said picture-in-picture processing means to store said predetermined amount of said detected video signal for each tuned channel and produce said display signal.

4. The picture-in-picture system of claim 3, wherein said means for detecting includes means for detecting a video signal which when displayed causes the display of a uniformly blanked image.

5. A picture-in-picture system for a television receiver, comprising:

tuner demodulator means having an input for receiving a plurality of radio frequency signals, and having a control input for receiving a first control signal, said tuner demodulator means tuning one of said radio frequency signals in response to said first control signal and producing a detected video signal therefrom at a first output;

a baseband video input terminal for receiving an auxiliary baseband video signal;

switch means having a first input coupled to said output of said tuner demodulator means for receiving said detected video signal, a second input for receiving said auxiliary baseband video signal, a control input for receiving a second control signal, and an output for developing a selected one of said video signals at said first and second inputs in response to said second control signal;

memory means having data representing a list of television channels stored therein;

main signal processing means for processing a main picture signal provided by said switch means and corresponding to a main picture;

picture-by-picture processing means coupled to said output of said switch means for receiving said selected video signal and for storing a predetermined amount of said selected video signal, and for producing a display signal which when displayed on a display screen produces a display comprising an inset-image displayed in one of a plurality of inset-image locations, said inset-image being related to said stored video signal;

control means for controlling said tuner demodulator means and for controlling said picture-to-picture processing means, said control means developing said first control signal, and said control means developing said control signal for controlling said switch means; and means for detecting the absence of program information in said main picture signal, said detecting means main picture signal and an output coupled to said control means for developing a third control signal indicative of the absence of program information in said main picture signal;

said control means in response to said third control signal generates said second control signal causing said switch means to select said detected video signal of said tuner demodulator means, generates said first control signal to cause said tuner demodulator means to tune each of said television channels represented in said stored list of television channels, and automatically causes said picture-in-picture processing means to store said predetermined amount of said detected video signal for each tuned channel and produce said display signal.

6. The picture-in-picture system of claim 5, wherein said control means generates said second control signal causing said switch means to select said auxiliary baseband video signal and causes said picture-in-picture processing means to store a predetermined amount of said auxiliary baseband video signal.

7. A picture-in-picture system for a videocassette recorder, comprising:

tuner demodulator means having an input for receiving a plurality of radio frequency signals, and having a control input for receiving a first control signal, said tuner demodulator means tuning one of said radio frequency signals in response to said first control signal and producing a detected video signal therefrom at a first output;

means for recovering a video signal from a recording medium;

switch means having a first input coupled to said output of said tuner demodulator means for receiving said detected video signal, a second input for receiving said recovered video signal from said recording medium, a control input for receiving a second control signal, and an output for developing a selected one of said video signals at said first and second inputs in response to said second control signal;

memory means having data representing a list of television channels stored therein;

picture-in-picture processing means coupled to said output of said switch means for receiving said selected video signal, for storing a predetermined amount of said selected video signal, and for producing a display signal which when displayed on a display screen produces a display comprising an image displayed in one of a plurality of image locations, said image being related to said stored video signal, control means for controlling said tuner demodulator means and for controlling said picture-in-picture processing means, said control means developing said first control signal, and said control means developing said second control signal for controlling said switch means; and means for detecting the absence of program information in said recovered video signal from said recording medium, said absence of said program information being indicative of the termination of a video program, said detecting means having an input for receiving said recovered video signal from said recording medium and an output coupled to said control means for developing a third control signal indicative of the absence of program information in said recovered video signal from said recording medium;

said control means in response to said third control signal generates said second control signal causing said switch means to select said detected video signal of said tuner demodulator means, generates said first control signal to cause said tuner demodulator means to tune each of said television channels represented in said list of television channels, and automatically causes said picture-in-picture processing means to store said predetermined amount of said detected video signal for each of said tuned channels and produce said display signal.

8. A picture-in-picture system for a videocassette recorder, comprising:

tuner demodulator means having an input for receiving a plurality of radio frequency signals, and having a control input for receiving a first control signal, said tuner demodulator means tuning one of said radio frequency signals in response to said first control signal and producing a detected video signal therefrom at a first output;

means for recovering a video signal from a recording medium;

switch means having a first input coupled to said output of said tuner demodulator means for receiving said detected video signal, a second input for receiving said recovered video signal from said recording medium, a control input for receiving a second control signal, and an output for developing a selected one of said video signals at said first and second inputs in response to said second control signal;

memory means having data representing a list of television channels stored therein;

picture-by-picture processing means coupled to said output of said switch means for receiving said selected video signal, for storing a predetermined amount of said selected video signal, and for producing a display signal which when displayed on a display screen produces a display comprising an image displayed in one of a plurality of image locations, said image being related to said stored video signal, control means for controlling said tuner demodulator means and for controlling said picture-in-picture processing means, said control means developing said first control signal, and said control means developing said second control signal for controlling said switch means;

means for detecting the absence of program information in said recovered video signal from said recording medium, said absence of said program information being indicative of the termination of a video program, said detecting means having an input for receiving said recovered video signal from said recording medium and an output coupled to said control means for developing a third control signal indicative of the absence of program information in said recovered video signal from said recording medium;

said control means in response to said third control signal generates said second control signal causing said switch means to selected said detected video signal of said tuner demodulator means, generates said first control signal to cause said tuner demodulator means to tune each of said television channels represented in said list of television channels, and automatically causes said picture-in-picture processing means to store said predetermined amount of said detected video signal for each of said tuned channels and produce said display signal;

drive means for driving said recording medium; and sensing means coupled to said drive means for generating a fourth control signal representative of sensing a condition in which a video signal containing program information is no longer recovered from said recording medium;

said control means in response to said fourth control signal generates said second control signal causing said switch means to select said detected video signal of said tuner demodulator means, generates said first control signal to cause said tuner demodulator means to tune each of said television channels represented in said stored list of television channels, and automatically causes said picture-in-picture processing means to store said predetermined amount of said detected video signal for each of said tuned channels and produce said display signal.

9. A picture-in-picture system for a television receiver, comprising:

tuner demodulator means having an input for receiving a plurality of radio frequency signals corresponding to a plurality of television channels, and having a control input for receiving a first control signal, said tuner demodulator means tuning one of said radio frequency signals corresponding to a particular television channel in response to said first control signal and producing a detected video signal therefrom at a first output;

main signal processing means for processing a main picture signal provided by said tuner demodulator means and corresponding to a main picture;

picture-in-picture processing means coupled to said first output of said tuner demodulator means for receiving said detected video signal and for storing a predetermined amount of said detected video signal, and for producing a display signal which when displayed on a display screen produces a display comprising an inset-image displayed in one of a plurality of inset-image locations, said inset-image being related to said stored video signal;

control means for controlling said tuner demodulator means and for controlling said picture-in-picture processing means, said control means having an output for developing said first control signal; and means for detecting the absence of program information in said main picture signal, said detecting means having an input for receiving said main picture signal and an output coupled to said control means for developing a second control signal indicative of the absence of program information in said main picture signal;

said control means in response to the detection of said second control signal generates said first control signal to automatically cause said tuner demodulator means to tune each of said plurality of television channels, and automatically causes said picture-inpicture processing means to store said predetermined amount of said detected video signal for each of said tuned channels and to produce said display signal.

10. A picture-in-picture system for a videocassette recorder, comprising:

tuner demodulator means having an input for receiving a plurality of radio frequency signals, and having a control input for receiving a first control signal, said tuner demodulator means tuning one of said radio frequency signals in response to said first control signal and producing a detected video signal therefrom at a first output;

means for recording video signals onto a video tape, and for recovering playback video signals from said video tape;

switch means having a first input coupled to said output of said tuner demodulator means for receiving said detected video signal, a second input for receiving said playback video signal, a control input for receiving a second control signal, and an output for developing a selected one of said video signals at said first and second inputs in response to said second control signal;

picture-in-picture processing means coupled to said output of said switch means for receiving said selected video signal, for storing a predetermined amount of said selected video signal, and for producing a display signal which when displayed on a display screen produces a display comprising an image displayed in one of a plurality of image locations, said image being related to said stored video signal, control means for controlling said tuner demodulator means and for controlling said picture-in-picture processing means, said control means developing said first control signal, and said control means developing said second control signal for controlling said switch means; and means for detecting the absence of program information in said playback video signal, said absence of said program information being indicative of the termination of a video program, said detecting means having an input for receiving said playback video signal and an output coupled to said control means for developing a third control signal indicative of the absence of program information in said playback video signal;

said control means in response to said third control signal generates said second control signal causing said switch means to select said detected video signal of said tuner demodulator means, generates said first control signal to cause said tuner demodulator means to automatically tune each of said plurality of radio frequency signals, and automatically causes said picture-to-picture processing means to store said predetermined amount of said detected video signal for each of said tuned channels and produce said display signal.

11. A picture-in-picture system for a videocassette recorder, comprising:

tuner demodulator means having an input for receiving a plurality of radio frequency signals, and having a control input for receiving a first control signal, said tuner demodulator means tuning one of said radio frequency signals in response to said first control signal and producing a detected video signal therefrom at a first output;

means for recording video signal therefrom at a first output; recovering playback video signals from said video tape;

switch means having a first input coupled to said output of said tuner demodulator means for receiving said detected video signal, a second input for receiving said playback video signal, a control input for receiving a second control signal, and an output for developing a selected one of said video signals at said first and second inputs in response to said second control signal;

picture-in-picture processing means coupled to said output of said switch means for receiving said selected video signal, for storing a predetermined amount of said selected video signal, and for producing a display signal which when displayed on a display screen produces a display comprising an image displayed in one of a plurality of image locations, said image being related to said stored video signal, control means for controlling said tuner demodulator means and for controlling said picture-in-picture processing means, said control means developing said first control signal, and said control means developing said second control signal for controlling said switch means;

means for detecting the absence of program information in said playback video signal, said absence of said program information being indicative of the termination of a video program, said detecting means having an input for receiving said playback video signal and an output coupled to said control means for developing a third control signal indicative of the absence of program information in said playback video signal;

said control means in response to said third control signal generates said second control signal causing said switch means to select said detected video signal of said tuner demodulator means, generates said first control signal to cause said tuner demodulator means to automatically tune each of said plurality of radio frequency signals, and automatically causes said picture-in-picture processing means to store said predetermined amount of said detected video signal for each of said tuned channels and produce said display signal;

tape drive means for driving said video tape; and end-of-tape sensing means coupled to said tape drive means for detecting an end-of-tape condition and generating a fourth control signal in response thereto;

said control means in response to said fourth control signal generates said second control signal causing said switch means to select said detected video signal of said tuner demodulator means, generates said first control signal to cause said tuner demodulator means to tune each of said plurality of television channels, and automatically causes said picture-in-picture processing means to store said predetermined amount of said detected video signal for each of said tuned radio frequency signals and produce said display signal.

12. A television system, comprising:

selection means for selecting a television signal from a plurality of television signals;

signal processing means for operating in a first mode of operation for producing a video signal representing a full-size picture corresponding to a selected one of said plurality of television signals, and for operating in a second mode of operation for producing a multiple-image video signal representative of a plurality of inset-images, each of said inset-images corresponding to a selected one of said plurality of television signals, said signal processing means switching between said first and second modes of operation in response to a first control signal;

video signal storing means for storing samples representative of a selected television signal for each of said plurality of television signals;

detection means for providing a second control signal indicative of the detection of an absence of program information when said signal processing means is operating in said first mode of operation; and control means coupled to said detection means for receiving said second control signal, said control means being coupled to said video signal storing means, said selection means, and said signal processing means;

said control means in response to said second control signal causes said selection means to select each of said plurality of television signals, sequentially, causes said video signal storing means to store said samples, and generates said first control signal causing said signal processing means to switch to said second mode of operation for producing said multiple-image picture signal.

* * * * *

UNITED STATES PATENT AND TRADEMARK OFFICE
CERTIFICATE OF CORRECTION

PATENT NO.  :   5,161,019

DATED       :   November 3, 1992

INVENTOR(S) :   Peter M. Emanuel

It is certified that error appears in the above-identified patent and that said Letters Patent is hereby corrected as shown below:

Column 8, line 9 , after "means" and before "main" insert -- having an input for receiving said --;
Column 12, lines 1 and 2, that portion reading "signal therefrom at a first output;" should read -- signals onto a video tape, and for --

Signed and Sealed this

First Day of February, 1994

Attest:

BRUCE LEHMAN

Attesting Officer

Commissioner of Patents and Trademarks